N. G. BERGLUND.
DRILL CHUCK.
APPLICATION FILED JULY 6, 1917.
1,265,707.
Patented May 7, 1918.
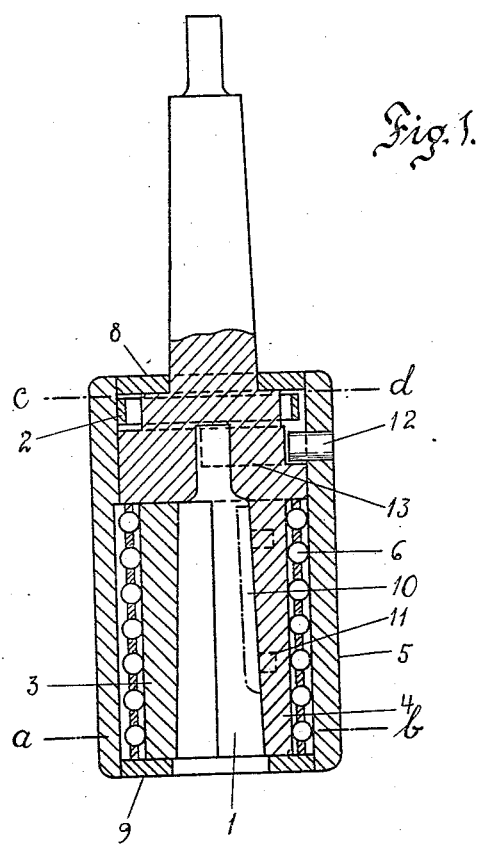
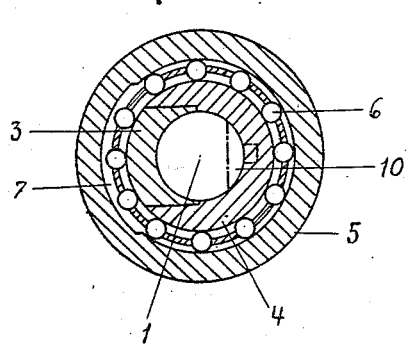
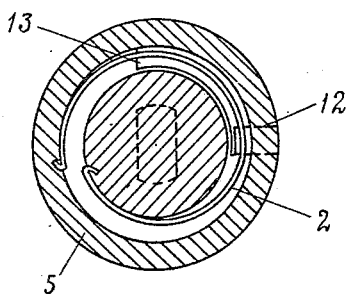
Inventor:
Nils Gustaf Berglund

UNITED STATES PATENT OFFICE.

NILS GUSTAF BERGLUND, OF VEDEVÅG, SWEDEN.

DRILL-CHUCK.

1,265,707.

Specification of Letters Patent.   Patented May 7, 1918.

Application filed July 6, 1917. Serial No. 179,052.

*To all whom it may concern:*

Be it known that I, NILS GUSTAF BERGLUND, a subject of the King of Sweden, residing at Vedevåg, in the Province of Västmanland and Kingdom of Sweden, have invented a new and useful Drill-Chuck, of which the following is a specification.

The present invention refers to such drill-chucks for drills with conical fastening and which consist of a fixed and a loose part which, together, form an exteriorly cylindrical holder which is so arranged that the drill, by means of a simple manipulation, can be fastened in or released from the chuck while the drilling machine is in operation.

The improvement consists mainly in the fixed and the loose parts being held together by a hollow cylinder between which and the holder there is arranged a roller-bearing or a ball-bearing, and by the roller-path being provided with a slot in order that when the hollow cylinder is rotated in such a way that the said slot comes just opposite the loose part, this loose part may be able to move outward and thereby release the drill.

The present invention is also characterized by a loose part or catch to be placed in the conical aperture so that it will be possible to employ drills with broken catch-pins.

The invention is illustrated by the accompanying drawing which, in Figure 1 shows the chuck in longitudinal section, while Fig. 2 is a transverse section along the line *a—b* in Fig. 1. Fig. 3 is a section along the line *c—d* in Fig. 1.

The drill-holder, 4, which is provided with a conical aperture, 1, for the drill, has a longitudinal groove in which a loose part, 3, is placed in such a way that it forms a part of the outwardly cylindrical holder. Around the holder there is arranged a hollow cylinder, 5, between which and the holder there is arranged a roller-bearing or a ball-bearing, 6, which retains the loose part, 3, in its place.

In the roller-path there is made at a place in the cylinder, 5, a shallow slot, 7, of somewhat greater breadth than the loose part, 3, so that when the cylinder, 5, is rotated in such a manner that the slot comes just opposite the loose part, as is shown in Figs. 1 and 2 in the drawing, the part, 3, can then move outward and thereby release the drill. A spring, 2, retains the cylinder, 5, in the position that is required for keeping the drill fixed. At both ends of the cylinder the latter is provided with disks, 8 and 9, which keep the parts together.

In order to be able to employ drills whose catch-pins have been broken off, the wall of the conical aperture is provided with pin-holes for pins, 11, on a loose part, 10, so that the latter can be attached to the said wall of the conical hole. By grinding the drill-fastening so that the latter fits against the said loose part, drills which have been broken off can, as was said above, also be used in the chuck.

When the drill is to be released, the hollow cylinder, 5, is rotated about one-quarter of a turn, after which the loose part, 3, can fall out and release the drill. As a result of the roller-bearing or the ball-bearing, the friction that arises on pressing the drill into the conical aperture is, to a great extent, nullified, so that the cylinder, 5, can easily be rotated by breaking by hand while the drilling-machine is in motion and the drill can conveniently be changed without its being necessary to stop the drilling-machine. In order to prevent the cylinder, 5, from being rotated too far it is provided with a catch device consisting of a pin, 12, firmly attached to the cylinder, which pin engages in a groove, 13, in the holder.

I claim.

1. In a drill-chuck the combination of a fixed part (4), a loose part (3) which enters into a longitudinal groove in the fixed part, a ball-bearing (6) which surrounds the fixed and the loose parts and a cylinder (5) surrounding the ball-bearing and provided with a longitudinal slot (7), substantially as described.

2. In a drill-chuck the combination of a fixed part (4), a loose part (3) which enters into a longitudinal groove in the fixed part, a roller-bearing (6) which surrounds the fixed and the loose parts and a cylinder (5) surrounding the roller-bearing and provided with a longitudinal slot (7), substantially as described.

3. In a drill-chuck the combination of a fixed part (4), a loose part (3) which enters into a longitudinal groove in the fixed part, a ball-bearing (6) which surrounds the fixed and the loose parts and a cylinder (5) surrounding the ball-bearing and provided with a longitudinal slot (7), a spring (2) fixed partly in the cylinder (5) and partly in the fixed part (4), and a pin (12) fixed in the cylinder (5) and entering into a groove (13) in the fixed part, substantially as described.

4. In a drill-chuck the combination of a fixed part (4), a loose part (3) which enters into a longitudinal groove in the fixed part, a roller-bearing (6) which surrounds the fixed and the loose parts and a cylinder (5) surrounding the roller-bearing and provided with a longitudinal slot (7), a spring (2) fixed partly in the cylinder (5) and partly in the fixed part (4), and a pin (12) fixed in the cylinder (5) and entering into a groove (13) in the fixed part, substantially as described.

5. In a drill-chuck the combination of a fixed part (4), a loose part (3) which enters into a longitudinal groove in the fixed part, a ball-bearing (6) which surrounds the fixed and the loose parts and a cylinder (5) surrounding the ball-bearing and provided with a longitudinal slot (7), a loose part (10) provided with pins (11) entering into holes in the fixed part (4), substantially as described.

6. In a drill-chuck the combination of a fixed part (4), a loose part (3) which enters into a longitudinal groove in the fixed part, a roller-bearing (6) which surrounds the fixed and the loose parts and a cylinder (5) surrounding the roller-bearing and provided with a longitudinal slot (7), a loose part (10) provided with pins (11) entering into holes in the fixed part (4), substantially as described.

NILS GUSTAF BERGLUND.

Copies of this patent may be obtained for five cents each, by addressing the "Commissioner of Patents, Washington, D. C."